US012803931B2

(12) United States Patent
Hanscom et al.

(10) Patent No.: US 12,803,931 B2
(45) Date of Patent: Nov. 17, 2026

(54) SIMPLIFYING PCIE PROCESSING LOGIC USING A SHOCK ABSORBER BUFFER

(71) Applicant: International Business Machines Corporation, Armonk, NY (US)

(72) Inventors: Jeffrey Charles Hanscom, Poughkeepsie, NY (US); Eric Norman Lais, Georgetown, TX (US); Ryan Patrick Lancaster, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 18/610,456

(22) Filed: Mar. 20, 2024

(65) Prior Publication Data

US 2025/0300945 A1 Sep. 25, 2025

(51) Int. Cl.
*H04L 49/103* (2022.01)
*H04L 49/253* (2022.01)

(52) U.S. Cl.
CPC .......... *H04L 49/103* (2013.01); *H04L 49/254* (2013.01)

(58) Field of Classification Search
None
See application file for complete search history.

(56) References Cited

U.S. PATENT DOCUMENTS 11,537,524 B2 12/2022 Segev
11,550,694 B2 1/2023 Zhang
11,726,944 B2 8/2023 Ping
2007/0112995 A1 5/2007 Manula et al.
2010/0049886 A1 2/2010 Iwaoka et al.
2019/0310947 A1* 10/2019 Raisch .................. G06F 3/0647
(Continued)

FOREIGN PATENT DOCUMENTS

JP 2023164403 A 11/2023

OTHER PUBLICATIONS

International Searching Authority, "Notification of Transmittal of the International Search Report and the Written Opinion of the International Searching Authority, or Declaration," Patent Cooperation Treaty May 13, 2025, 14 pages, International Application No.—PCT/ EP2025/055030.
(Continued)

*Primary Examiner* — Minh Trang T Nguyen
(74) *Attorney, Agent, or Firm* — Harrity & Harrity, LLP

(57) ABSTRACT

A computer-implemented method, a computer system and a computer program product simplify PCIe Transaction Layer Packet (TLP) processing logic. The method includes providing a buffer in a PCIe processing environment between a data link layer and a transaction layer, wherein the buffer includes a maximum buffer size and a command interface to the data link layer. The method also includes storing PCIe data from the data link layer in the buffer and identifying a transaction layer packet in stored PCIe data. The method further includes forward the transaction layer packet from the buffer, where a transaction layer packet is forwarded to the transaction layer for each clock cycle in the plurality of clock cycles of the PCIe processing environment. Lastly, the method includes determining that the maximum buffer size has been reaches and notifying the data link layer using the command interface to initiate a PCIe replay.

20 Claims, 3 Drawing Sheets

(56) References Cited

U.S. PATENT DOCUMENTS

| | | | | |
|---|---|---|---|---|
| 2020/0042425 | A1* | 2/2020 | Zhang | G06F 11/3041 |
| 2021/0013999 | A1* | 1/2021 | Choudhary | H04L 1/0082 |

OTHER PUBLICATIONS

Chaudhari et al., "Evaluating Effect of Write Combining on PCIe Throughput to Improve HPC Interconnect Performance,", IEEE, 2017, DOI 10.1109/CLUSTER.2017.109, 2 pages.

* cited by examiner

SIMPLIFYING PCIE PROCESSING LOGIC USING A SHOCK ABSORBER BUFFER

BACKGROUND

Embodiments relate generally to the field of data communications and, more specifically, to simplifying Transaction Layer Packet (TLP) processing logic in a Peripheral Component Interconnect Express (PCIe) architecture.

Within a computer environment, a Peripheral Component Interconnect Express (PCIe) architecture may be defined that is capable of performing point-to-point serial linking using one or a plurality of channels, and is configured for interconnection at the motherboard level, expansion card interface, and the like. In such an architecture, a layered structure including a software layer, a transaction layer, a data link layer, and a physical layer may be defined to control and manage information transmission. The transaction layer is configured to generate transaction layer packets (TLPs), and as larger data bus widths become necessary to handle the inbound data stream from the PCIe link, the Transaction Layer Packet processing logic may become more complex because multiple TLPs may fit entirely inside the data bus width in a single clock cycle.

SUMMARY

An embodiment is directed to a computer-implemented method for simplifying PCIe Transaction Layer Packet (TLP) processing logic. The method may include providing a buffer in a PCIe processing environment between a data link layer and a transaction layer, wherein the PCIe processing environment comprises a plurality of clock cycles and the buffer includes a maximum buffer size and a command interface to the data link layer. The method may also include storing PCIe data from the data link layer in the buffer and identifying at least one transaction layer packet in stored PCIe data. The method may further include forwarding the transaction layer packet from the buffer, where the at least one transaction layer packet is forwarded to the transaction layer for each clock cycle in the plurality of clock cycles of the PCIe processing environment. Lastly, the method may include determining that an amount of the stored PCIe data is at least equal to the maximum buffer size and notifying the data link layer using the command interface of the buffer that the maximum buffer size has been reached.

In another embodiment, the method may include requesting, by the data link layer, a replay in the PCIe processing environment in response to the notifying the data link layer using the command interface of the buffer, where the PCIe data from the data link layer may be nullified starting at a replay position in the PCIe data from the data link layer.

In a further embodiment, the method may include storing the PCIe data from the PCIe data link layer in the buffer starting at the replay position in the PCIe data from the data link layer in response to detecting the replay in the PCIe processing environment and determining that the amount of the stored PCIe data is below the maximum buffer size.

In an additional embodiment, the storing the PCIe data from the data link layer in the buffer may include determining that the PCIe data from the data link layer is valid.

In yet another embodiment, the buffer may comprise a plurality of arrays and the method may include obtaining metadata from the at least one transaction layer packet and associating the metadata with each array in the plurality of arrays.

In still another embodiment, the metadata may be selected from a group consisting of: a transaction layer packet start indicator, a transaction layer packet end indicator and a transaction layer packet nullify indicator.

In another embodiment, each array in the plurality of arrays is four bytes wide.

In addition to a computer-implemented method, additional embodiments are directed to a computer system and a computer program product for simplifying PCIe Transaction Layer Packet (TLP) processing logic.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
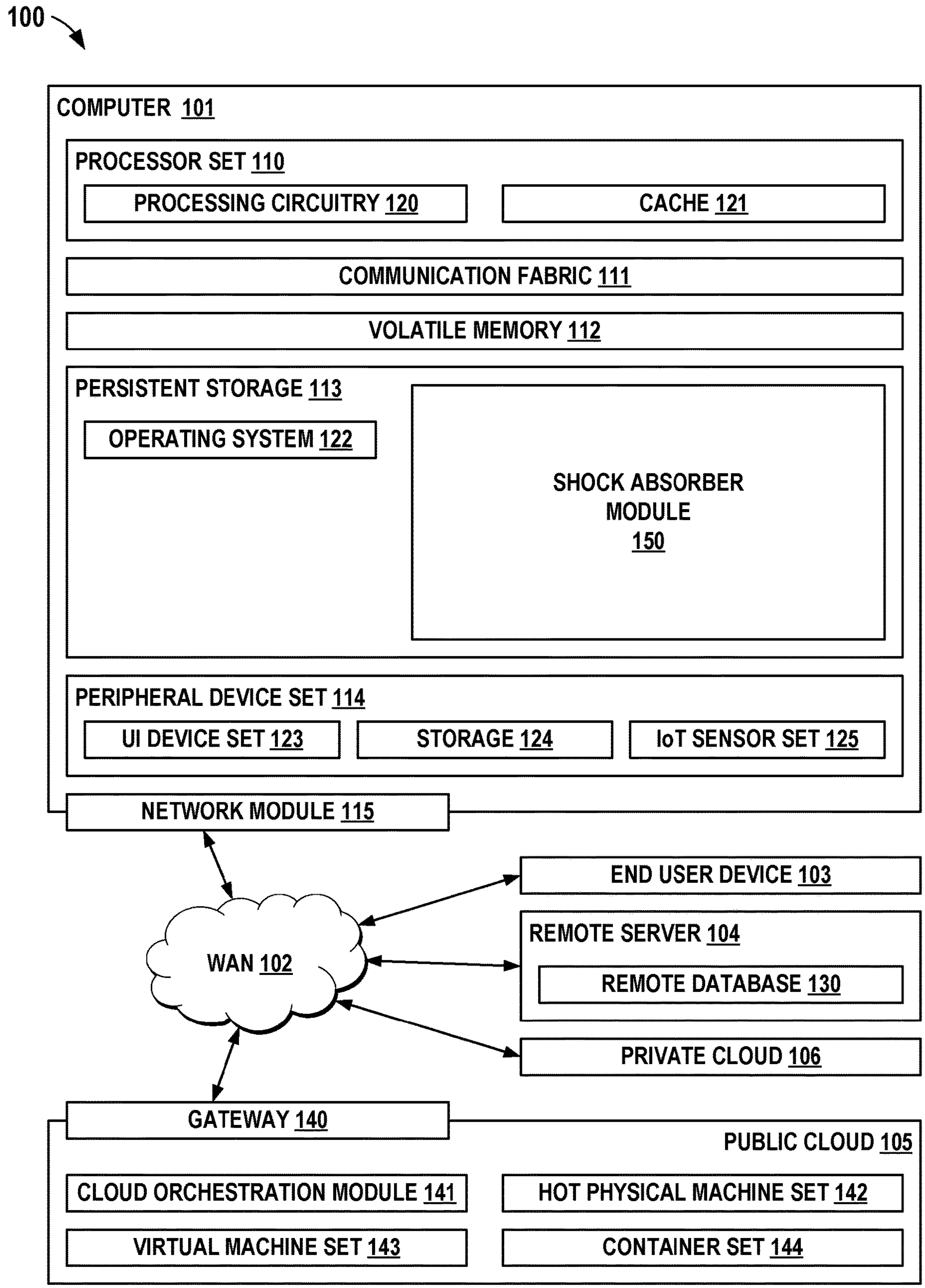
FIG. 1 depicts a block diagram of an example computer system in which various embodiments may be implemented.

In Peripheral Component Interconnect Express (PCIe) processing environments with multiple lanes using high levels of bandwidth, the PCIe Transaction Layer receive processing logic for transaction layer packets (TLPs) may require data bus widths of 32 bytes or more in order to manage the inbound PCIe data stream. At the same time, internal Data Link Layer data busses larger than 16 bytes wide may force the PCIe Transaction Layer Receive processing logic to become extremely complex because more than one TLP can fit entirely within the width of the data bus in a single clock cycle. For instance, using a 32-byte bus width and accounting for Data Link Layer framing, two 3DW headers without Enhanced CRC (ECRC) can be received in a single PCIe clock cycle.

When inbound TLPs arriving in the same clock cycle are of different "types," e.g., Non-Posted or Posted or Completion, then the PCIe Transaction Layer Receive processing logic can easily handle this case because each type must be pushed into its own Receive Data buffer in the Transaction Layer. However, in the event that multiple TLPs of the SAME type are received in a single clock cycle, the inbound PCIe Transaction Layer Receive processing logic may become increasingly complex. If the chip technology node supports multi-write port arrays, e.g., SRAMs or GRAs, etc., then there must be one processing path per TLP to process the TLPs in parallel, which doubles the overhead of the PCIe Transaction Layer Receive processing logic, though the array itself does not have to change format or size because each processing pipeline can have a dedicated write port to the target array. Inbound Completion TLP processing may be even more complicated because it must be able to process multiple partial completions for a single request tag simultaneously. This means that the first completion TLP in the cycle affects the target data location for the second completion TLP received in the same clock cycle along with the validity checking on the header fields for the second TLP.

It may therefore be useful to provide a method or system to simplify PCIe Transaction Layer Packet (TLP) processing logic by providing a "Shock Absorber Buffer" (SAB) just after the PCIe Data Link Layer Receive logic and just before the Transaction Layer where the TLP processing pipelines reside. In this method or system, the Inbound data may be pushed into the SAB as it is received off the link from the PCIe Data Link Layer and then pulled from the SAB in FIFO order and pushed to the Transaction Layer processing pipelines, controlling the flow such that only one TLP may be processed by the Transaction Layer per clock cycle. Limiting the Transaction Layer to processing only one TLP per clock cycle reduces the Receive processing logic complexity and avoids the requirement of using the standard methods of handling multiple TLPs per clock cycle known in the art, such as multi-write-port arrays in the Transaction Layer. All Inbound Buffers can be sized exactly with no required double-sized arrays and the completion processing pipeline complexity may be reduced, allowing for large outbound non-posted request sizes.

By adding extra processing time through the flow control applied to the output of the SAB, the buffer may fill up in worst-case scenarios, such as a constant stream of two TLPs per clock cycle without any gaps in the data flow. To manage this possibility, the SAB may use an internal command feedback path to the Data Link Layer in order to indicate when the SAB is "full" and allow for pushing back on the PCIe link data flow using the PCIe ACK/NAK protocol. A NAK would be issued to the link partner, e.g., requesting a PCIe replay, for the TLP which cannot be pulled into the SAB from the Data Link Layer and the TLP would be dropped by the PCIe Transaction Layer Receive processing logic, along with all subsequent TLPs until a PCIe Replay occurs from the link partner. Once the PCIe replay has been detected, as long as the SAB is not full, the inbound TLPs would again be pushed into the SAB from the Data Link Layer and processing may pick up from the point that the data was dropped. The time needed to produce a PCIe replay, i.e., the replay latency, gives the Transaction Layer time to process the backlog of data stored in the SAB and catch back up, even possibly emptying the SAB.

In such a method or system, the SAB must be sized such that it can handle the normal data flow and alignment of the link without requiring excessive PCIe replays, since each PCIe replay may degrade PCIe link performance. The worst-case two TLPs per clock cycle situation mentioned above is a rare occurrence in PCIe processing environments, so allowing the method or system to issue a NAK and cause a PCIe replay in the worst-case scenario is an acceptable tradeoff for the large potential savings in Transaction Layer Receive processing logic complexity. Due to the certainty that only one TLP per clock cycle will ever be received by the Transaction Layer after the SAB, the processing pipeline complexity can be minimized. In addition, the completion processing pipeline complexity can be further reduced using the method or system by allowing backpressure to the SAB in cases where extra completion table lookups or updates for partial completions can be completed one at a time. The method or system may also separate completion TLP processing from posted and non-posted request processing on the read side of the SAB. Using the method or system described herein, Receive Header and Data buffers can be single write-port arrays and sized to exact depth requirements for the bandwidth so no extra space is required to handle worst-case bandwidth or TLP alignment issues. As a result, the method or system may simplify Transaction Layer Packet (TLP) processing logic and provide more efficient operation and processing of PCIe packets.

Referring to FIG. 1, computing environment 100 contains an example of an environment for the execution of at least some of the computer code involved in performing the inventive methods, such as shock absorber module 150. In addition to shock absorber module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and shock absorber module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in shock absorber module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in shock absorber module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to simplify PCIe Transaction Layer Packet (TLP) processing logic. In particular, shock absorber module 150 may provide a buffer within a PCIe processing environment, specifically between the PCIe Data Link Layer and the PCIe Transaction Layer, where inbound PCIe data, including transaction layer packets (TLPs), may be pushed into the buffer as it is received off the PCI link at full bandwidth. The PCIe data may be pulled from the buffer in First-In, First-Out (FIFO) order and pushed to the Transaction Layer processing pipelines, but only at a maximum processing rate of a single TLP per clock cycle. This means that, for instance, if two TLPs are received from the Data Link Layer in a single clock cycle, those TLPs would leave the buffer over two clock cycles. As a result of this data flow rate control, the buffer may reach a maximum capacity of data, i.e., become "full," in a worst-case scenario. To account for this possibility, the buffer may include a feedback path to the Data Link Layer, where the buffer may indicate a "full" condition to the Data Link Layer, which may further request a PCIe replay by issuing a PCIe NAK packet. In this scenario, all inbound PCIe packets are nullified, or dropped, by the PCIe link and thus the buffer, starting at the point of the NAK packet. Inbound PCIe data from the point of the NAK packet would only be accepted once the PCIe replay has been detected and a determination has been made by the shock absorber module 150 that the buffer is no longer "full." It should be noted that the time needed to process the NAK and initiate a PCIe replay, then return to the point of the NAK, may allow the Transaction Layer to process any inbound PCIe data that may be present in the buffer and clear any possible backlog in the buffer.

Figure 2:
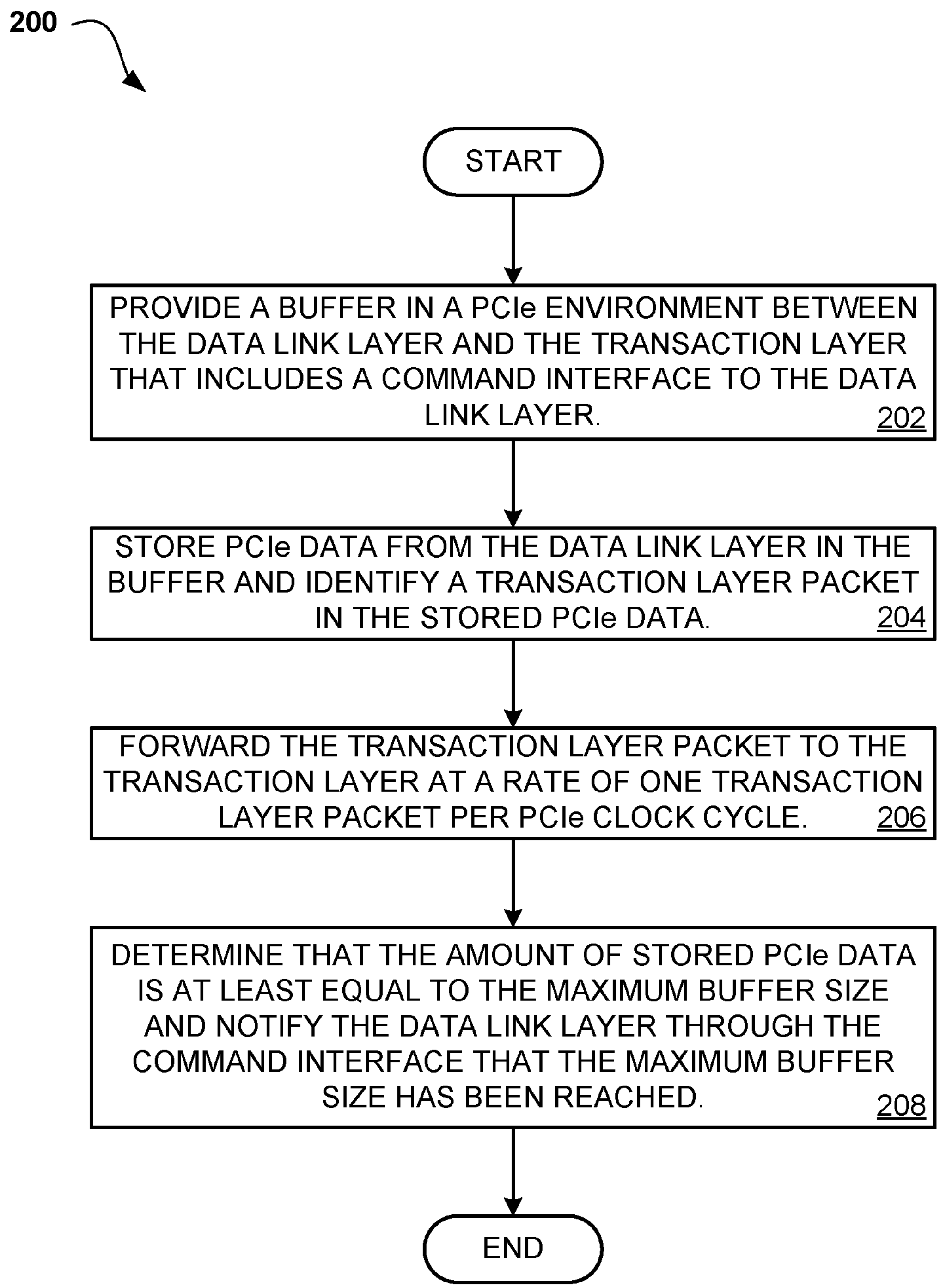
FIG. 2 depicts a flow chart diagram for a process to simplify PCIe Transaction Layer Packet (TLP) processing logic according to an embodiment.

Referring to FIG. 2, an operational flowchart illustrating a process 200 that simplifies PCIe Transaction Layer Packet (TLP) processing logic is depicted according to at least one embodiment. At 202, the shock absorber module 150 may provide a shock absorber buffer, e.g., buffer 300 of FIG. 3, within a PCIe environment that may sit between a PCIe Data Link Layer, e.g., data link layer 320, and a PCIe Transaction Layer, e.g., transaction layer 340. One of ordinary skill in the art will recognize that the shock absorber buffer must be sized to handle normal PCIe data flow and alignment of the link without requiring excessive PCIe replay actions, since PCIe replays will interfere with normal operations and degrade link performance. The shock absorber buffer may be constructed of multiple separate arrays, e.g., arrays 308, that are nominally four bytes wide, since PCIe transaction layer packets (TLPs), when including headers, are sized in four-byte increments. In addition, both the write interface, e.g., controller 302, and read interface, e.g., compressor 306, of the shock absorber buffer must be able to push and pull the maximum data bus width of data in each clock cycle while also allowing for a minimum of four bytes per clock cycle to allow for minimum trained bus width applications. The shock absorber buffer also includes a feedback path, i.e., a command interface or credit manager 304, to the Data Link Layer to indicate when the shock absorber buffer is "full", i.e., the buffer cannot absorb any additional PCIe data from the Data Link Layer, which allows the Data Link Layer to push back on the PCIe link data flow using the PCIe ACK/NAK protocol and requesting a PCIe replay, at which point the shock absorber buffer drops subsequent packets, as described below.

At 204, the inbound data from the PCIe Data Link Layer may be stored in the buffer and a transaction layer packet (TLP) may be identified in the stored PCIe data. In embodiments, the write control logic of the shock absorber buffer compresses the inbound data stream such that only valid TLP data off the PCIe link is written to the shock absorber buffer, thus reducing shock absorber buffer entry usage. Also, to aid in processing of the TLPs on the read side of the shock absorber buffer, metadata may be stored with each four-byte data entry including, but not limited to, TLP start, end and nullify indicators. The four-byte address offset for the read and write pointers may be used to indicate when the array has data to process as well as when it is empty and full, but only the write address is required by the read side of the shock absorber buffer to know when there is data to process. It is important to note that the read side of the shock absorber buffer will read as much data as possible in every clock cycle for which it has processing capability, so if only four bytes are valid in any given clock cycle, the shock absorber buffer will read and process those four bytes.

At 206, the transaction layer packet may be forwarded from the buffer to the PCIe Transaction Layer in First-In, First-Out (FIFO) order with flow control such that only a known amount of transaction layer packets may reach the Transaction Layer in each clock cycle. It is important to note that this is likely to be one TLP per clock cycle, and the discussion herein refers to a single transaction layer packet per clock cycle, but it is not required to restrict to one but rather a specific known amount that is consistent each clock cycle. While processing the data in the buffer, when a further TLP is encountered in the same clock cycle, the further TLP in that clock cycle may not be pushed to the Transaction Layer and instead, the shock absorber buffer fetches as much stored data as possible to fill the remaining space in the processing pipeline in the next clock cycle as it pushes the current TLP forward to the Transaction Layer. In the next clock cycle, it will start the next TLP with a possible full bus width of data. As PCIe data is read from the shock absorber buffer, the space in the buffer is freed, which allows the Data Link Layer to push more data forward into the buffer, though because of the flow restriction of one TLP per clock cycle, this means that the shock absorber buffer may fill to the point that no further TLPs may be absorbed by the buffer. It should be noted that, in order to identify individual TLPs in the PCIe data and implement the flow control, a Read Controller within the shock absorber buffer must parse the meta-data mentioned above in the shock absorber buffer array entries to know when TLPs start and end.

At 208, the shock absorber module 150 may determine that an amount of stored PCIe data is at least equal to the maximum buffer size, i.e., the buffer is full, and the Data Link Layer may be notified of that condition so that the Data Link Layer may push back on the flow of PCIe data by issuing a PCIe NAK packet to request a replay. At this point, PCIe data is nullified, or dropped, from the replay position in the PCIe data, or the moment that the NAK packet is issued. Once the replay is detected and the buffer is not full, data is stored and processed from the point in the data that matches the moment that the NAK packet was issued, i.e., the replay position. The replay latency gives the Transaction Layer time to process the backlog of data stored in the buffer and catch back up, even possibly emptying the buffer.

As a result of the process 200, PCIe completion processing pipeline complexity can be further reduced by allowing backpressure to the shock absorber buffer in cases where extra completion table lookups or updates for partial completions can be completed one at a time. Completion TLP processing may also be separated from a combined posted and non-posted request processing on the read side of the shock absorber buffer, thus needing only two pipelines instead of three. Receive Header and Shock absorber buffers in the Transaction Layer may also be single write-port arrays and sized to exact depth requirements for the bandwidth so no extra space is required to handle the worst-case bandwidth or TLP alignment issues.

Figure 3:
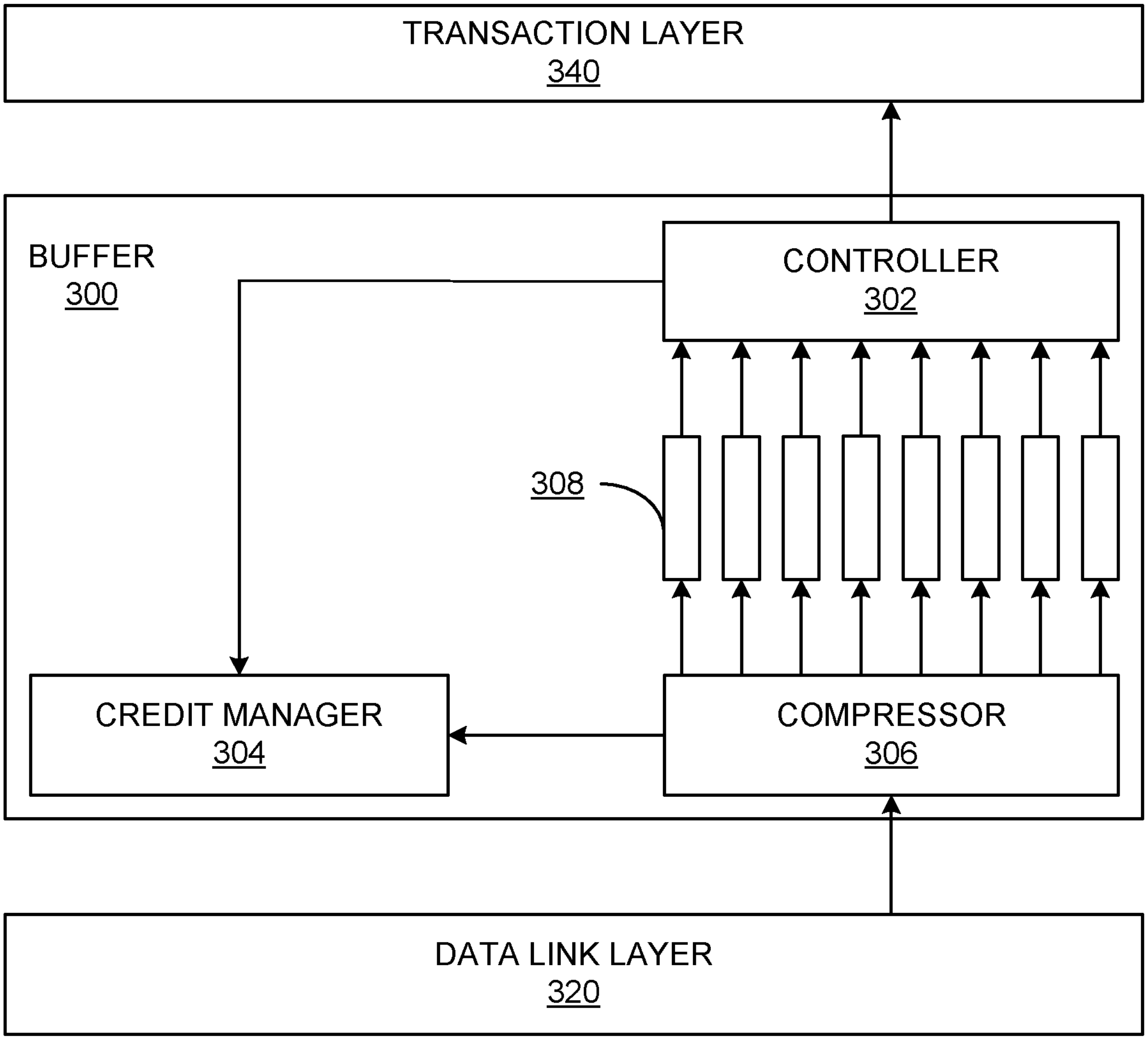
FIG. 3 depicts an example of a buffer deployed in a PCIe processing environment between a data link layer and a transaction layer according to an embodiment.

Referring to FIG. 3, an example of a buffer 300 deployed in a PCIe processing environment between a data link layer 320 and a transaction layer 340 is depicted according to an embodiment. The buffer 300 may be comprised of a compressor 306 that may act as the read interface from the data link layer 320 described with respect to FIG. 2, a controller 302 that may serve as the write interface to the transaction layer 340, and arrays 308 that mat act as the arrays mentioned above. In addition, a credit manager 304 may be implemented that interfaces with the compressor 306, and thus the data link layer 320, to provide the communication interface needed to notify the data link layer 320 that the buffer 300 is full, such that a PCIe replay may be initiated.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for simplifying PCIe Transaction Layer Packet (TLP) processing logic, the computer-implemented method comprising:

providing a buffer in a PCIe processing environment between a data link layer and a transaction layer, wherein the PCIe processing environment comprises a plurality of clock cycles and the buffer includes a maximum buffer size and a command interface to the data link layer and wherein inbound data is pushed into the buffer in First-In, First-Out (FIFO) order and pushed to the transaction layer processing pipelines at a maximum processing rate of a single TLP per clock cycle;

storing PCIe data from the data link layer in the buffer, wherein write control logic of the buffer compresses the inbound data, thereby writing only valid TLP data from the PCIe to the buffer, and identifying at least one transaction layer packet in stored PCIe data;

forwarding the transaction layer packet from the buffer, wherein the at least one transaction layer packet is forwarded to the transaction layer for each clock cycle in the plurality of clock cycles of the PCIe processing environment; and determining that an amount of the stored PCIe data is at least equal to the maximum buffer size and notifying the data link layer using the command interface of the buffer that the maximum buffer size has been reached.

2. The computer-implemented method of claim 1, further comprising requesting, by the data link layer, a replay in the PCIe processing environment in response to the notifying the data link layer using the command interface of the buffer, wherein the PCIe data from the data link layer is nullified starting at a replay position in the PCIe data from the data link layer.

3. The computer-implemented method of claim 2, further comprising storing the PCIe data from the PCIe data link layer in the buffer starting at the replay position in the PCIe data from the data link layer in response to detecting the replay in the PCIe processing environment and determining that the amount of the stored PCIe data is below the maximum buffer size.

4. The computer-implemented method of claim 1, wherein the storing the PCIe data from the data link layer in the buffer further comprises determining that the PCIe data from the data link layer is valid.

5. The computer-implemented method of claim 1, wherein the buffer comprises a plurality of arrays, further comprising obtaining metadata from the at least one transaction layer packet and associating the metadata with each array in the plurality of arrays.

6. The computer-implemented method of claim 5, wherein the metadata is selected from a group consisting of: a transaction layer packet start indicator, a transaction layer packet end indicator and a transaction layer packet nullify indicator.

7. The computer-implemented method of claim 5, wherein each array in the plurality of arrays is four bytes wide.

8. A computer system for simplifying PCIe Transaction Layer Packet (TLP) processing logic, the computer system comprising:

one or more processors, one or more computer-readable memories, and one or more computer-readable storage media;

program instructions, stored on at least one of the one or more computer-readable storage media for execution by at least one of the one or more processors via at least one of the one or more computer-readable memories, to provide a buffer in a PCIe processing environment between a data link layer and a transaction layer, wherein the PCIe processing environment comprises a plurality of clock cycles and the buffer includes a maximum buffer size and a command interface to the data link layer and wherein inbound data is pushed into the buffer in First-In, First-Out (FIFO) order and pushed to the transaction layer processing pipelines at a maximum processing rate of a single TLP per clock cycle;

program instruction, stored on at least one of the one or more computer-readable storage media, to store PCIe data from the data link layer in the buffer, wherein write control logic of the buffer compresses the inbound data, thereby writing only valid TLP data from the PCIe to the buffer, and identify at least one transaction layer packet in stored PCIe data;

program instructions, stored on at least one of the one or more computer-readable storage media for execution by at least one of the one or more processors via at least one of the one or more computer-readable memories, to store PCIe data from the data link layer in the buffer and identify at least one transaction layer packet in stored PCIe data;

program instructions, stored on at least one of the one or more computer-readable storage media for execution by at least one of the one or more processors via at least one of the one or more computer-readable memories, to forward the transaction layer packet from the buffer, wherein the at least one transaction layer packet is forwarded to the transaction layer for each clock cycle in the plurality of clock cycles of the PCIe processing environment; and program instructions, stored on at least one of the one or more computer-readable storage media for execution by at least one of the one or more processors via at least one of the one or more computer-readable memories, to determine that an amount of the stored PCIe data is at least equal to the maximum buffer size and notify the data link layer using the command interface of the buffer that the maximum buffer size has been reached.

9. The computer system of claim 8, further comprising program instructions, stored on at least one of the one or more computer-readable storage media for execution by at least one of the one or more processors via at least one of the one or more computer-readable memories, to request, by the data link layer, a replay in the PCIe processing environment in response to the notifying the data link layer using the command interface of the buffer, wherein the PCIe data from the data link layer is nullified starting at a replay position in the PCIe data from the data link layer.

10. The computer system of claim 9, further comprising program instructions, stored on at least one of the one or more computer-readable storage media for execution by at least one of the one or more processors via at least one of the one or more computer-readable memories, to store the PCIe data from the PCIe data link layer in the buffer starting at the replay position in the PCIe data from the data link layer in response to detecting the replay in the PCIe processing environment and determining that the amount of the stored PCIe data is below the maximum buffer size.

11. The computer system of claim 8, wherein the program instructions, stored on at least one of the one or more computer-readable storage media for execution by at least one of the one or more processors via at least one of the one or more computer-readable memories, to store the PCIe data from the data link layer in the buffer further comprise program instructions, stored on at least one of the one or more computer-readable storage media for execution by at least one of the one or more processors via at least one of the one or more computer-readable memories, to determine that the PCIe data from the data link layer is valid.

12. The computer system of claim 8, wherein the buffer comprises a plurality of arrays, further comprising program instructions, stored on at least one of the one or more computer-readable storage media for execution by at least one of the one or more processors via at least one of the one or more computer-readable memories, to obtain metadata from the at least one transaction layer packet and associate the metadata with each array in the plurality of arrays.

13. The computer system of claim 12, wherein the metadata is selected from a group consisting of: a transaction layer packet start indicator, a transaction layer packet end indicator and a transaction layer packet nullify indicator.

14. The computer system of claim 12, wherein each array in the plurality of arrays is four bytes wide.

15. A computer program product for simplifying PCIe Transaction Layer Packet (TLP) processing logic, the computer program product comprising:

one or more computer-readable storage media;

program instructions, stored on at least one of the one or more computer-readable storage media for execution by at least one of the one or more processors via at least one of the one or more computer-readable memories, to provide a buffer in a PCIe processing environment between a data link layer and a transaction layer, wherein the PCIe processing environment comprises a plurality of clock cycles and the buffer includes a maximum buffer size and a command interface to the data link layer and wherein inbound data is pushed into the buffer in First-In, First-Out (FIFO) order and pushed to the transaction layer processing pipelines at a maximum processing rate of a single TLP per clock cycle;

program instruction, stored on at least one of the one or more computer-readable storage media, to store PCIe data from the data link layer in the buffer, wherein write control logic of the buffer compresses the inbound data, thereby writing only valid TLP data from the PCIe to the buffer, and identify at least one transaction layer packet in stored PCIe data;

program instructions, stored on at least one of the one or more computer-readable storage media, to forward the transaction layer packet from the buffer, wherein the at least one transaction layer packet is forwarded to the transaction layer for each clock cycle in the plurality of clock cycles of the PCIe processing environment; and program instructions, stored on at least one of the one or more computer-readable storage media, to determine that an amount of the stored PCIe data is at least equal to the maximum buffer size and notify the data link layer using the command interface of the buffer that the maximum buffer size has been reached.

16. The computer program product of claim 15, further comprising program instructions, stored on at least one of the one or more computer-readable storage media, to request, by the data link layer, a replay in the PCIe processing environment in response to the notifying the data link layer using the command interface of the buffer, wherein the PCIe data from the data link layer is nullified starting at a replay position in the PCIe data from the data link layer.

17. The computer program product of claim 16, further comprising program instructions, stored on at least one of the one or more computer-readable storage media, to store the PCIe data from the PCIe data link layer in the buffer starting at the replay position in the PCIe data from the data link layer in response to detecting the replay in the PCIe processing environment and determining that the amount of the stored PCIe data is below the maximum buffer size.

18. The computer program product of claim 15, wherein the program instructions, stored on at least one of the one or more computer-readable storage media, to store the PCIe data from the data link layer in the buffer further comprise program instructions, stored on at least one of the one or more computer-readable storage media, to determine that the PCIe data from the data link layer is valid.

19. The computer program product of claim 15, wherein the buffer comprises a plurality of arrays, further comprising program instructions, stored on at least one of the one or more computer-readable storage media, to obtain metadata from the at least one transaction layer packet and associate the metadata with each array in the plurality of arrays.

20. The computer program product of claim 19, wherein the metadata is selected from a group consisting of: a transaction layer packet start indicator, a transaction layer packet end indicator and a transaction layer packet nullify indicator.

* * * * *